S. W. CADY.
TOOTH FOR TILLAGE IMPLEMENTS.
APPLICATION FILED SEPT. 19, 1919.

1,366,557.

Patented Jan. 25, 1921.

Inventor:
Sherman W. Cady,
By Chas. E. Lord
Atty.

UNITED STATES PATENT OFFICE.

SHERMAN W. CADY, OF AUBURN, NEW YORK, ASSIGNOR TO INTERNATIONAL HARVESTER COMPANY, A CORPORATION OF NEW JERSEY.

TOOTH FOR TILLAGE IMPLEMENTS.

1,366,557.   Specification of Letters Patent.   Patented Jan. 25, 1921.

Application filed September 19, 1919. Serial No. 325,014.

*To all whom it may concern:*

Be it known that I, SHERMAN W. CADY, a citizen of the United States, residing at Auburn, in the county of Cayuga and State of New York, have invented certain new and useful Improvements in Teeth for Tillage Implements, of which the following is a full, clear, and exact specification.

This invention relates to soil working teeth for harrows and cultivators, and its object is to provide a tooth designed particularly for spring tooth harrows, and intended for a specific class of work wherein it is desired to have the tooth cut and uproot plants while working in clay soils without needless loss of power through unnecessary surface engagement between the tooth and the soil. This object is accomplished by a particular form of the fang or soil penetrating part of the tooth.

Figure 1:
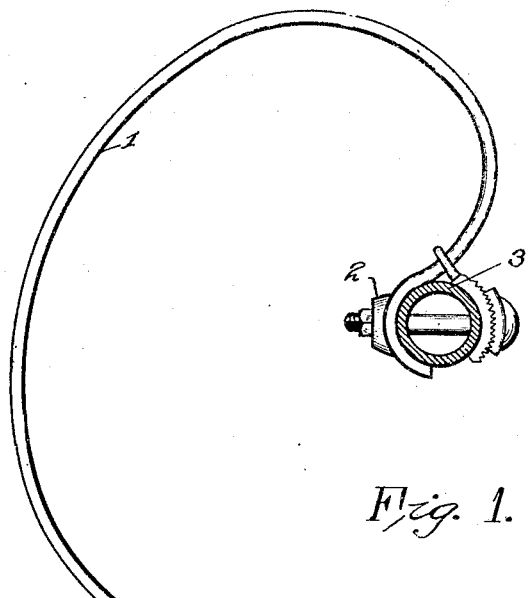
Figure 1 shows in side elevation, a harrow tooth formed according to this invention.
Figure 2:
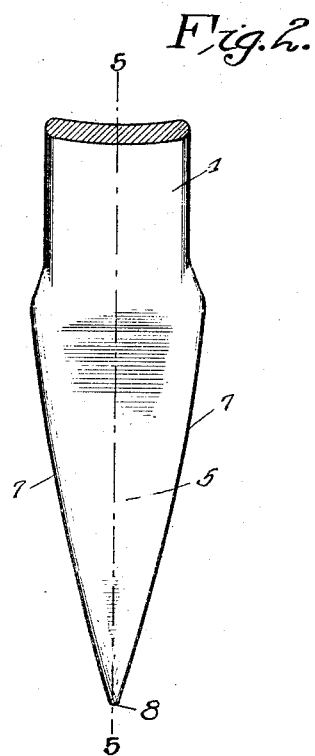
Fig. 2 is a plan view of the cutting part of the tooth.
Figure 3:
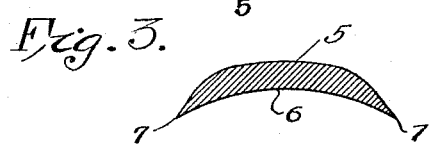
Fig. 3 is a transverse section taken on the line 4—4 of Fig. 1.
Figure 4:
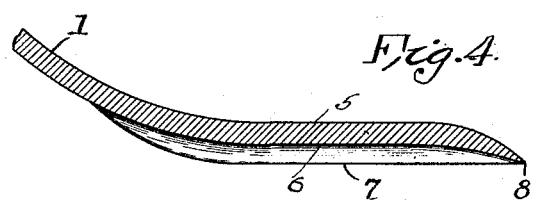
Fig. 4 is a longitudinal section along the line 5—5 of Fig. 2.

This tooth is intended for working in waxy or sticky soils, and it is desired to have the cutting portion of the tooth substantially horizontal and more or less flattened on its upper surface for running in under and uprooting plants. Satisfactory results are obtained by making the entering edge of the tool spear-shaped to provide a pointed, sharp-sided tool, but in order to clear a path for the horizontally disposed part of the tool which follows the cutting edge, the operating foot is provided with depending runner flanges. These flanges reduce the area of contact between the lower surface of the foot and the soil beneath, and therefore permit the tool to operate with less power than would be the case if this particular form of runner flanges were omitted.

Referring to the drawings, the body portion 1 of the tool is formed of the usual flat steel stock and having the customary adjustable fastening 2 to a transverse supporting bar 3. The body portion 1 is also curved in the usual manner but has an extended horizontally disposed foot or cutting element 4. The cutting element of the tooth varies from the usual designs by having a more or less flattened upper surface 5, a slightly concave under-surface 6 and depending beveled edges 7 terminating in the sharpened point 8. The beveled portion of the tool serves not only as the cutting edges but as runners for reducing the area of contact of the tool and the soil beneath and for cutting a clearance for the substantially horizontally disposed portion of the tool which is at the rear of its cutting edge.

In the operation of the tool its advancing point 8 cuts its way beneath the plants which it is desired to uproot, and these are gradually lifted by the slightly upwardly curved portion of the tooth following the tine. The V-shaped runners 7 slice the roots at each side of the entering point 8, and also serve as supports of small area for the tool in order that the lower surface of the tool will not unduly stick to the soil beneath, and consequently give the tool a bad action and also needlessly increase the load.

While there is shown and described but one embodiment of the invention, it is to be understood that it is capable of modifications. Changes, therefore, in the construction and arrangement of parts may be made which do not depart from the spirit and scope of the invention, as disclosed in the appended claims:

1. A tooth for tillage implements, comprising a body portion terminating in a horizontally disposed portion of V-form in plan, said horizontally disposed portion having beveled depending runner flanges at the rear of its point.

2. A spring tooth for tillage implements comprising a curved body portion terminating in a horizontally disposed spear-shaped point, said point having a convex upper surface and a concave lower surface in cross-section, the depending side edges of the point being provided with beveled cutting edges and runners, and the upper surface of the tooth being curved downwardly toward the point.

In testimony whereof I affix my signature.

SHERMAN W. CADY.